Patented Mar. 23, 1943

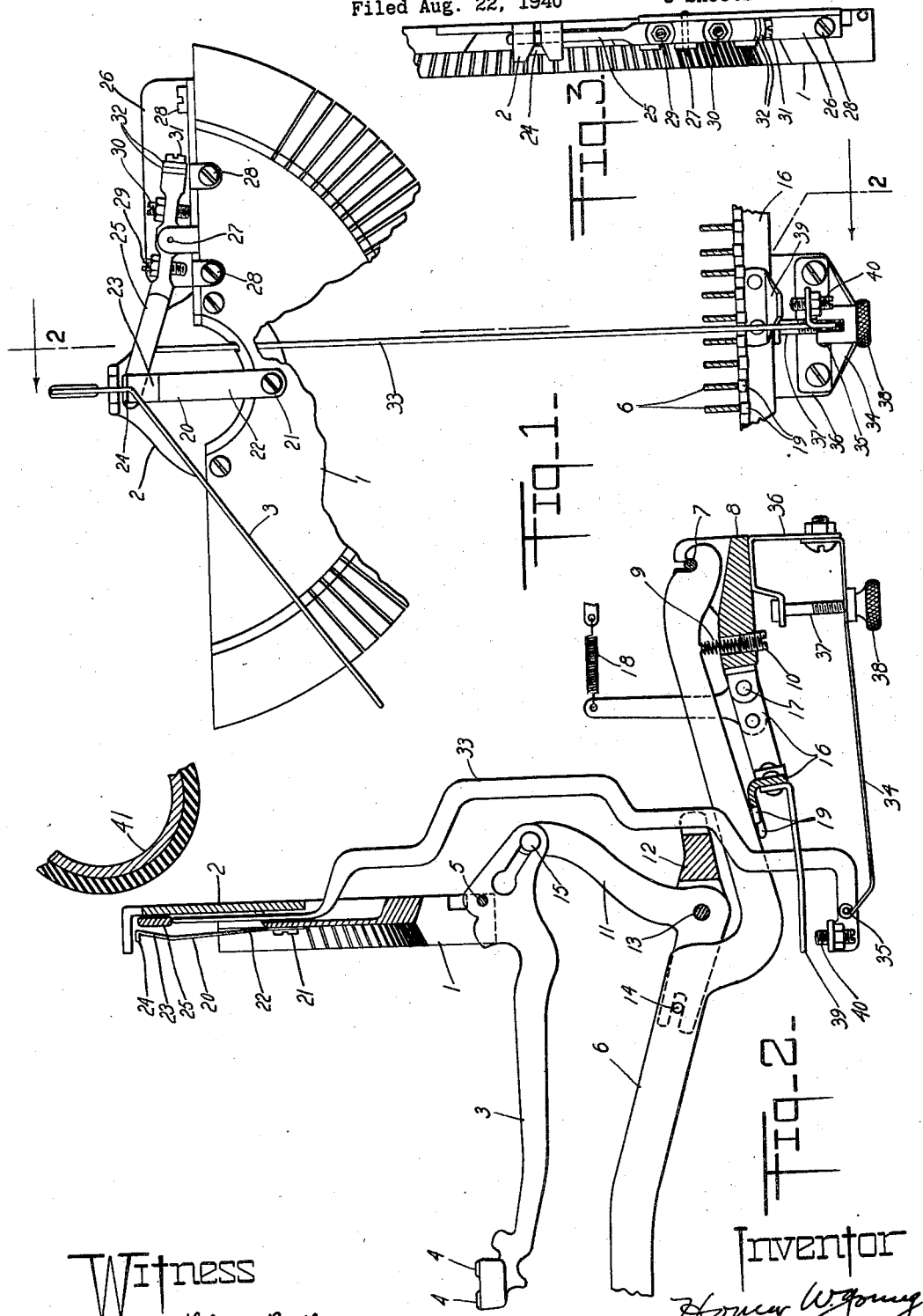

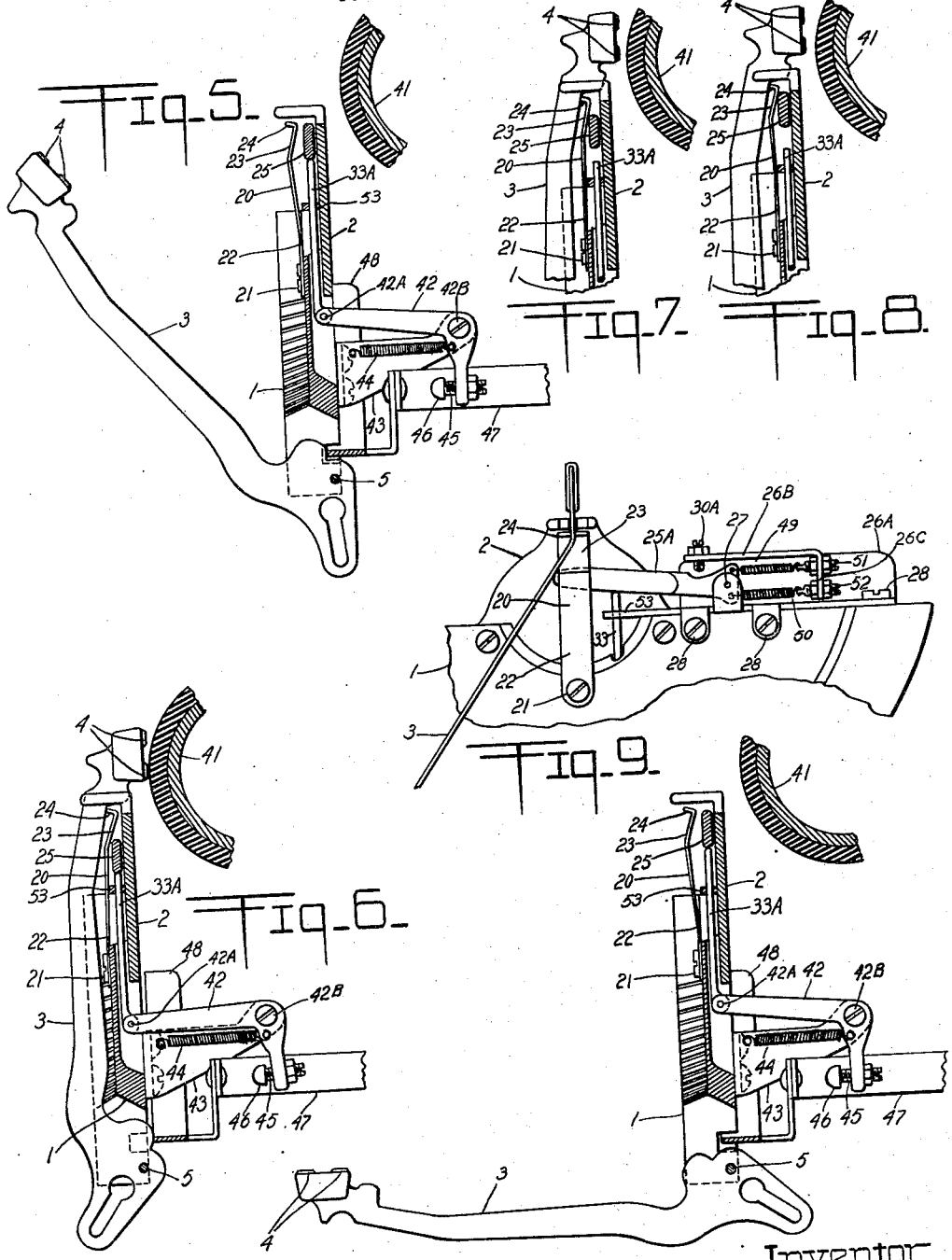

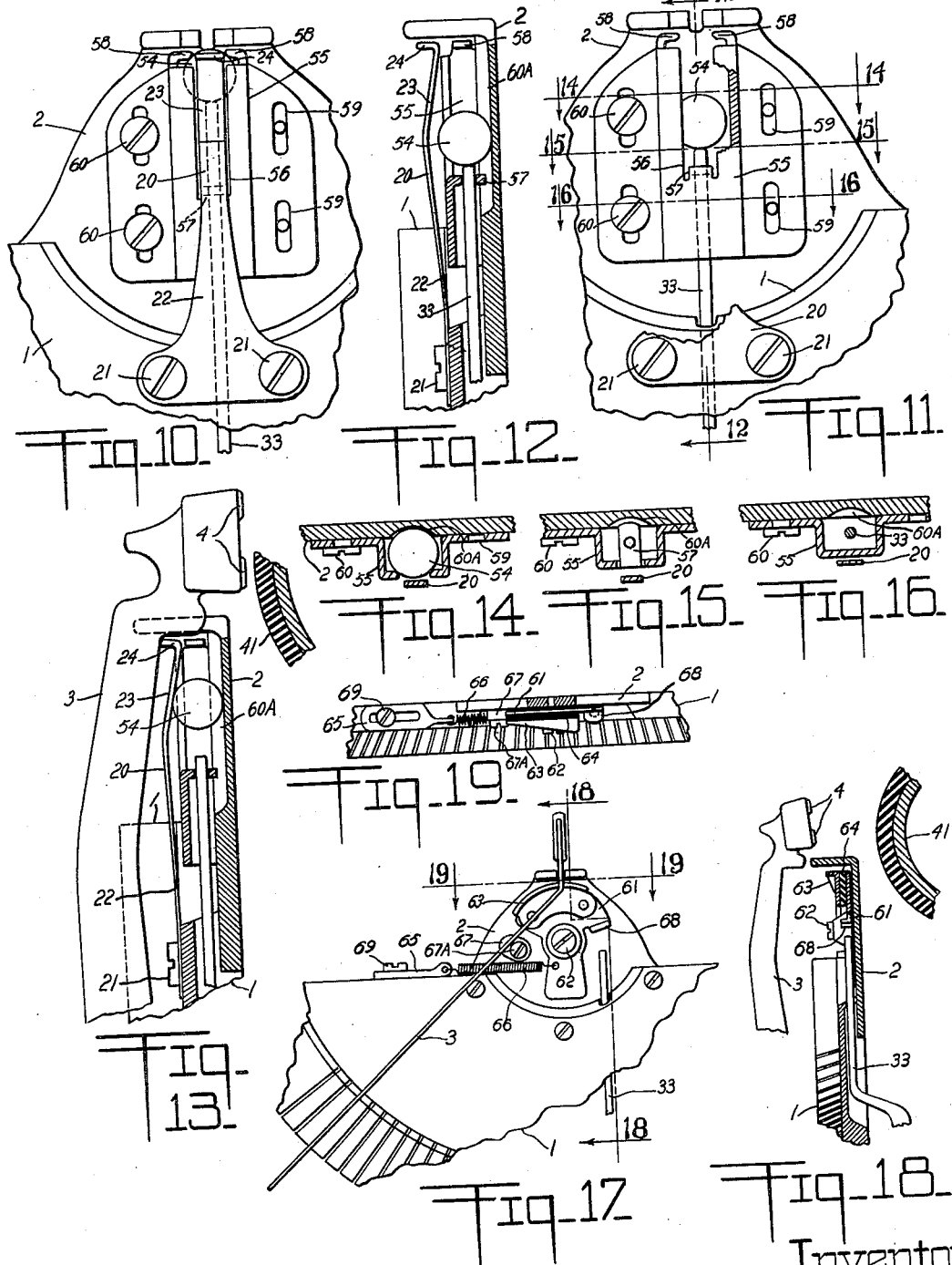

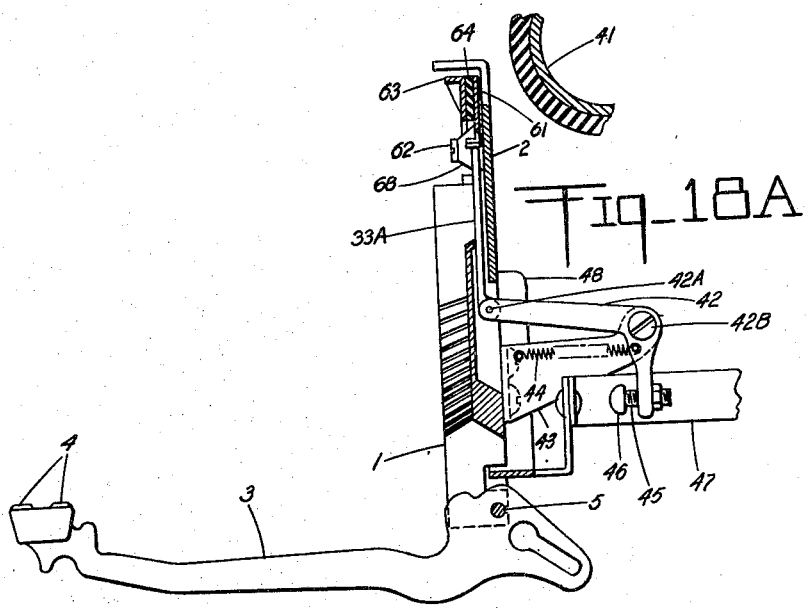
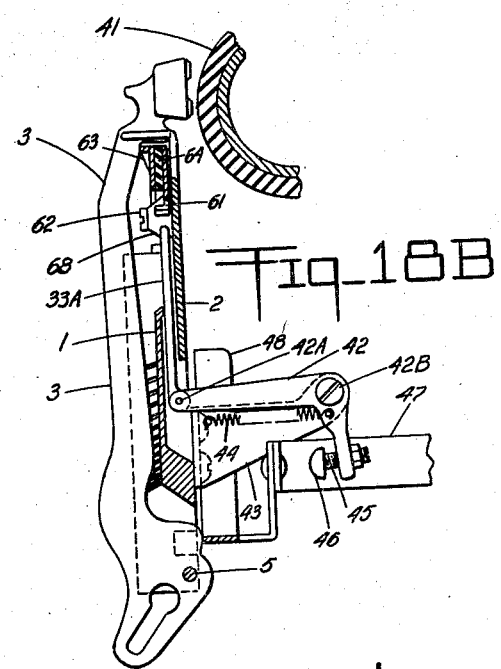

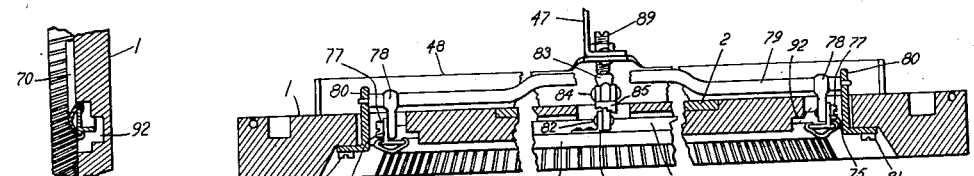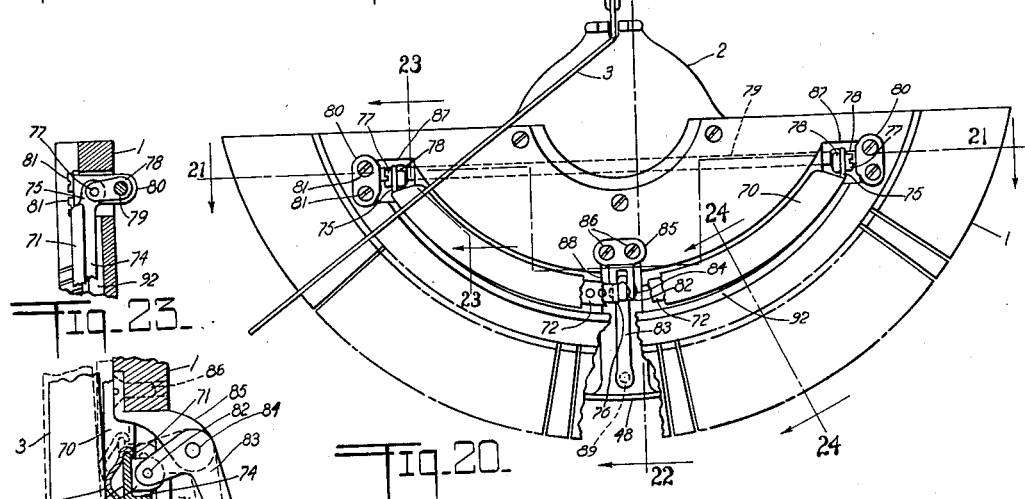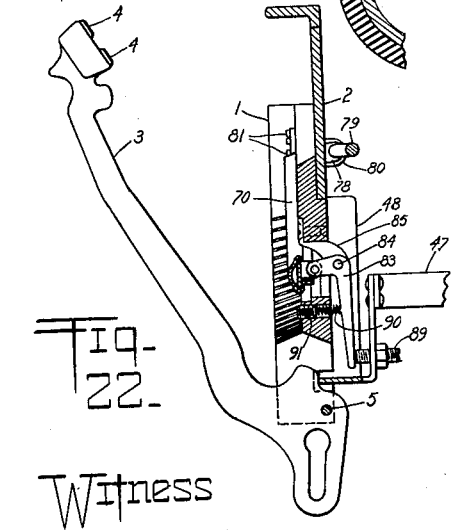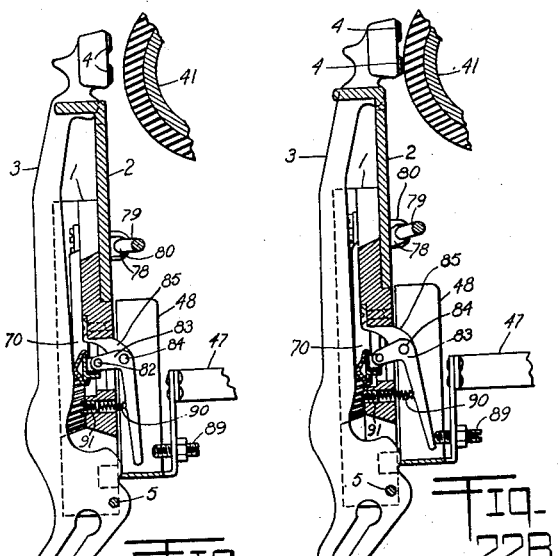

2,314,677

UNITED STATES PATENT OFFICE 2,314,677

COMPENSATING TYPE-BAR BUFFER FOR TYPEWRITERS

Homer W. Young, Springfield, Mo.

Application August 22, 1940, Serial No. 353,628

28 Claims. (Cl. 197—183)

My invention relates to typewriter anvils or buffers and particularly to a compensating buffer for controlling the impact of the type-face in printing.

Various attempts have been made in an effort to provide typewriter mechanism which will produce uniform type impressions but prior art has made no provision for varying the buffer action to compensate for type-bar strokes of different strength or speed. Buffers or anvils are in evidence which serve as yielding interventive mediums for the type-bars, but all such devices allow the type-faces to strike the platen with varying force (co-extensive with the forward speed of the type-bar). It is evident that any buffer or anvil which provides a standard or set interceptive action for the type-bars, while accommodating a type-bar stroke of a certain strength or speed, will not permit a proper printing action for either weaker or stronger strokes, and this fact is apparent regardless of whether such buffer is resilient or solid.

It is well known that the forwardly moving type-bar should be provided with an interceptive means which will furnish a resilient retarding action to the type-bar just prior to striking the platen and that the retarding action should be just sufficient to allow the momentum of the type-bar to complete the stroke with the proper force to make the desired impression. The device should then provide a kick-back effect to the bar when its force is expended to clear the type-face from the platen to prevent smudging or repeating. (Ordinarily an inked ribbon is disposed between the type-face and the platen as well as some impression receiving medium such as paper, however throughout this disclosure frequent mention of these elements will be avoided inasmuch as their structure and purpose is well known and their inclusion will be implied.)

In my invention I provide an interceptive member which is designed to intercept the type-bars at variable distances from the platen and which when positioned at different stations requires strokes of different strength or speed to overcome the opposing interventive action of the interceptive member to a degree that will result in proper impact of the type-face against the platen. I also provide actuating means for the interceptive member operable to progressively move the latter from a position of maximum intervention toward a position of minimum intervention, such movement being chronomatically controlled whereby a definite amount of progressive movement will occur during a certain period of elapsed time. I further provide a retaining mechanism in universal co-operation with the type-bars for holding the movable interceptive member in a position of maximum intervention when none of the type-bars are in operation, and in association with such mechanism I provide a means whereby the interceptive member is released when any one of the type-bars reaches a predetermined position in its forward stroke and whereupon the interceptive member will move toward a position of lesser intervention, the amount of such movement depending upon the amount of time elapsing between the instant of release and the instant of contact of the interceptive member by the type-bar and being consequent to the speed of the type-bar. Varying amounts of time will elapse during such periods due to nonuniformity of strokes and consequently the interceptive member will recede a corresponding amount, resulting in a type-bar interception at varying distances from the platen, such distance being in correlation to the speed of the type-bar.

The principal object of my invention is to provide a means for regulating the impact of the type-face against the impression receiving medium in such a manner as to result in uniform impressions regardless of the momentum of the type-bar in printing.

Another object of my invention is to provide an automatically variable means for imparting a rebound or whip action to the type-bar consistent with the speed of the stroke.

Another object of my invention is to provide a means for minimizing the noise resulting from the impact of the type-bar against the impression receiving medium.

A further object of my invention is to provide a buffer which affords a variable resistance to the type-bar whereby more resistance is automatically provided for a heavy stroke and less resistance is provided for a light stroke, the amount of resistance being co-extensive with the momentum of the type-bar.

Another object of my invention is to provide a buffer which affords an automatically variable retarding means for the type-bar whereby a variable portion of the force of the blow is absorbed by the retarding means while the remaining force is utilized in performing the impact, the latter force being uniform regardless of the original total force or momentum.

Another object of my invention is to provide a chronomatically controlled compensating buffer for absorbing excessive force imparted to type-bars whereby to produce uniform impressions.

Another object of my invention is to provide a cushioning shock absorbing stop for type-bars which through automatically controlled interceptive action will produce uniform type impressions from uneven key strokes.

Another object of my invention is to provide a stop for the type-bars that will prevent injury to the platen by excessively hard blows of the type-bars in writing and also to provide a means to prevent injury to the platen by the type-faces when no paper is in place on the platen.

Another object of my invention is to provide a means of producing uniform impressions from the type-faces whereby interposed carbon sheets will not be excessively cut by hard strokes and also to provide a means whereby stencils may be made in a uniform manner and without excessive cutting-out.

Another object of my invention is to provide a retractive type-bar buffer which during the latter portion of the forward stroke of the type-bar will have a chronomatically regulated diminishing buffering action upon the type-bar whereby the forward speed of the type-bar immediately prior to the printing impression will determine the amount of retractive action of the buffer to provide equalized printing impressions for strokes of varying forward speed.

Another object of my invention is to provide a retractive anvil for the type-bars which by affording interception to the latter at varying distances from the platen will permit the employment of a resilient whip means having a more extensive action than that commonly used, whereby the resilient member will exert a rebounding force upon the type-bar over a greater portion of its arcuate travel.

Other objects and advantages will be apparent from the following description, the accompanying drawings and the appended claims.

In the drawings:

Fig. 1 is a front elevation of one embodiment of my device.

Fig. 2 is a sectional side elevation taken on 2—2, Fig. 1.

Fig. 3 is a top view of the embodiment shown in Figs. 1 and 2.

Fig. 4 is a side elevation, partly in section, showing another embodiment of the release mechanism for the interceptive member.

Fig. 5 is a side elevation of the same embodiment showing the type-bar in position of initial release of the interceptive member.

Fig. 6 is a similar view showing the position of the type-bar, interceptive member and release means at the end of a slow stroke.

Fig. 7 is a similar view showing comparable positions of the elements near the end of a medium stroke.

Fig. 8 is a like view showing positions of the elements near the end of a hard stroke.

Fig. 9 is a front elevation showing one form of interceptive member.

Fig. 10 is a front elevation showing another form of interceptive member.

Fig. 11 is a fragmentary front elevation of the same member.

Fig. 12 is a sectional elevation taken on 12—12, Fig. 11, showing the interceptive member in a position of minimum interception.

Fig. 13 is a similar view showing the position of the interceptive member for a medium stroke.

Fig. 14 is a sectional view taken on 14—14, Fig. 11.

Fig. 15 is a sectional view taken on 15—15, Fig. 11.

Fig. 16 is a sectional view taken on 16—16, Fig. 11.

Fig. 17 is a front elevation showing another form of interceptive member.

Fig. 18 is a sectional elevation taken on 18—18, Fig. 17.

Fig. 18A is a similar sectional view showing this embodiment of the interceptive member together with the release mechanism of Fig. 4 and showing the position of the parts when the type-bar is farthest from the platen.

Fig. 18B is a view similar to Fig. 18A and showing the position of the parts near the end of a medium stroke.

Fig. 19 is a sectional view taken on 19—19, Fig. 17.

Fig. 20 is a front elevation of another embodiment of my invention.

Fig. 21 is a sectional view taken on 21—21, Fig. 20.

Fig. 22 is a sectional elevation taken on 22—22, Fig. 20, showing the position of the elements at the time of initial release of the interceptive member.

Fig. 22A is a similar view showing the position of the parts near the end of a hard stroke.

Fig. 22B is a similar view showing the position of the parts at the end of a light stroke.

Fig. 22C is a fragmentary sectional elevation taken on 22—22, Fig. 20, showing in phantom the relative positions of the parts for light and heavy strokes.

Fig. 23 is a fragmentary sectional elevation taken on 23—23, Fig. 20.

Fig. 24 is a fragmentary oblique section taken on 24—24, Fig. 20.

The reference characters throughout the several views represent similar parts.

With reference particularly to Figs. 1, 2 and 3, 1 is a type-bar segment to which is secured the type-bar guide 2. 3 is one of a series of type-bars hinged on the pivot wire 5 and carrying type-faces 4. 6 is one of a series of key-levers pivoted at 7 to the frame member 8. A spring 9 with adjusting screw 10 urges the key-lever upward. 11 is a sublever pivoted to the frame member 12 at 13 and cooperatively connected with the key-lever and the type-bar at 14 and 15 respectively.

Positioned transversely of the key-levers and in common operable relation therewith is a universal bar 16, hinged to the frame at 17 and urged upwardly by the spring 18. 19, 19 are prongs adapted to be bent into proper individual co-operative abuttal relation with the key-levers. Similar universal bars are employed on certain typewriters for operating other mechanism and such could be utilized for the present purposes. 20 is a flexible spring whip member secured to the segment at 21. This member has a thinned portion near the lower end 22 to provide additional flexibility at this point. The upper portion 23 is inclined toward the type-guide while the extreme top end 24 extends outwardly to provide an abutting seat for the type-bars when they approach the printing position. 25 is an interponent member comprising a bar which is pivotally connected to the supporting bracket 26 by the pin 27. The supporting bracket is attached to the segment by screws 28, 28. Adjusting screws 29 and 30 are provided for limiting the arcuate movement of the interponent member while the screw 31 and removable washers 32, 32 provide a means for adjusting the balance of the bar 25, whereby the portion extending between the spring whip member 20 and the type guide 2 is heavier than the opposite end. A vertically disposed supporting bar 33, guided by suitable openings in the segment 1 and urged upwardly by the spring 34, normally holds the interponent member 25 in its extreme upward position. 35 is a pin coupling the spring 34 to the bar 33. The spring 34 is secured to the bracket 36 which is in turn attached to the frame member 8. A screw 37 and nut 38 provide adjusting means for the spring 34. An extension arm 39 is secured to the universal bar 16 and is adapted to contact the adjusting screw 40 secured to the bar 33 upon partial depression of any of the key-levers, whereby upon further depression of the key-lever the bar 33 is moved downward to release the interponent bar 25. The bar 25 may then descend to its lowermost position, but such movement is not instantaneous inasmuch as the weight or mass embodied in the bar serves as a governing factor and the bar falls with a gradually accelerated movement which consumes a definite period of time for each portion of its descent.

A conventional platen upon which the paper or other impression receiving medium is supported is shown at 41. Any of the well known ribbon inking means may be employed and such is omitted from the drawings.

With reference to Figs. 4, 5, 6, 7 and 8, showing another embodiment of my invention, the means for releasing the interponent abuttal member 25 includes the vertically disposed supporting bar 33A pivotally connected at 42A to the bell crank lever 42 which is pivoted at 42B to the supporting member 43, the latter being rigidly secured to the segment 1. A spring 44 urges the adjusting screw 45 against the boss 46 located on the extension 47 of the universal bar 48. The universal bar 48 may be of the usual type employed in the escapement mechanism of most typewriters and is mounted for reciprocatory backward and forward movement when any of the type-bars 3 are elevated to their printing position. Usually a central guide-pin (not shown) is secured to the universal bar and reciprocates within a suitable opening in the type-bar segment 1 for maintaining proper alignment. Spring means (not shown) urges the universal bar forward in the usual manner. The type-bars contact the universal bar (which is in common co-operable relation to all the type-bars) when they near the end of the forward stroke. Backward movement of the universal bar, in cooperation with the bell-crank lever 42 and the supporting bar 33A, causes the release of the interponent member 25. A guide plate 53 (indicated in Fig. 4) for the supporting bar 33A is an extension of the supporting member 26 as further detailed in Fig. 9. It will be understood that the bar 25 in this embodiment may conform with either that shown at 25, Fig. 1 or at 25A, Fig. 9.

In Fig. 9, showing a spring-balanced interponent member, the bar 25A is pivoted at 27 to the supporting bracket 26A which has a forwardly extending top portion 26B. Spring 49 attached to the downwardly turned arm 26C by adjusting screw 51 is adapted to balance the bar 25A against its own weight, while the spring 50, similarly attached to the arm 26C by the adjusting screw 52 is adapted to adjustably provide any desired downward pull on the bar 25A. 30A is an adjusting screw for limiting the upward movement of the bar 25A. 53 is an extension of the supporting bracket 26A and carries an opening in its outer end which affords a guide for the vertical bar 33.

Figs. 10, 11, 12, 13, 14, 15 and 16 show another embodiment of my invention in which the interponent abutment member consists of the ball 54 which is carried in the cage 55, the walls of which form a vertically disposed guide for the ball. An opening 56 is provided in the front wall of the cage which is adapted to allow the upper portion of the spring 20 to pass within the cage. An inwardly projecting lip 57 carries an opening which serves as a guide for the supporting bar 33. Normally the ball 54 is held against the inwardly extending lips 58, 58 by the supporting bar 33. Slotted openings 59, 59, together with screws 60, 60 permit the cage to be adjustably secured to the type-guide 2. The whip spring 20 in this embodiment is secured to the segment 1 by two screws 21, 21. The type-guide 2 is provided with a vertically disposed elongated depression 60A which accommodates a portion of the ball 54.

Figs. 17, 18, 18A, 18B and 19 show another embodiment of my invention in which the interponent abutment member consists of a centrally pivoted oscillatory member 61 supported on the screw 62. This member carries a spirally tapering abutment anvil 63. Interposed between the member 61 and the anvil 63 is a shock absorbing cushion member 64 of resilient material such as rubber. Secured to the slotted bracket 65 is a light spring 66 which is attached to and urges the pivoted member 61 in a clockwise direction against the supporting bar 33. The stop member 67 secured to the type-guide 2 by the screw 67A provides an adjustable abutment against which the pivoted member 61 rests when held in its extreme counter-clockwise position by the supporting bar 33. A screw 69 adjustably secures the slotted bracket 65 to the segment 1.

Figs. 20, 21, 22, 22A, 22B, 22C, 23 and 24 depict another embodiment of my invention in which the arcuate anvil 70 provides the interponent abutment member for the type-bars. This member is preferably made of thin flexible metal which is flanged at 71, 71 (Fig. 22C) to loosely grip the supporting arcuate bar 72. The anvil 70 is provided with a rounded face 73 (Fig. 22C) for contact with the type-bars and provides a slight resiliency when struck by the bars. The arcuate bar 72 is provided with a stiffening rib 74 (Fig. 22C), a continuation of which (see Fig. 23) provides the extensions 75, 75 at either end. Centrally of the bar 72 is secured the backwardly extending arm 76. The supporting bar 72 together with the anvil 70 is hingedly mounted at the extreme ends (by screws 77, 77) on the arms 78, 78 rigidly secured to the shaft 79 which is pivotally mounted at its ends on the brackets 80, 80 secured to the segment 1 by screws 81, 81. Similarly the anvil assembly is hingedly supported centrally at 82 by the short arm of the bell-crank lever 83 which is pivotally mounted at 84 on the support 85 secured to the segment 1 by screws 86. Openings 87, 87 and 88 (Fig. 20) are provided in the type-bar segment 1 for accommodating the hinged assembly.

An adjusting screw 89 carried by the universal bar 48 urges the long arm of the bell crank 83 toward the segment 1, in turn causing the anvil assembly to swing outwardly and upwardly while maintaining a parallel relation to the segment through the co-acting levers 78, 78 on the shaft 79. A light spring 90 adjustably tightened by the screw 91 urges the long arm outwardly against the screw 89 aiding in the tendency of the anvil assembly to descend and retract within the arcuate slot 92 when the long arm of the bell crank lever is released. Such release occurs when one of the type-bars 3 operates to push the universal bar 48 rearwardly. The approximately extreme retractive position of the anvil and the corresponding type-bar position is shown in Fig. 22C by the solid lines while the dotted lines indicate the same parts in the non-retracted position, showing the corresponding type-bar, anvil assembly and bell-crank positions. Fig. 24 is a cross-sectional view showing the arcuate depression 92 in the segment 1 for accommodating the anvil.

In operation, with respect to the embodiment shown in Figs. 1, 2 and 3, when the key-lever 6 is depressed far enough to bring the type-bar 3 upward a predetermined distance (preferably more than half of its arcuate travel) the extension 39 on the universal bar 16 will contact the screw 40. A further depression of the key-lever will cause a downward movement of the supporting bar 33 to release the interponent member 25 whereupon the latter will begin descending. The type-bar, when near the end of its stroke, strikes the spring whip member 20 carrying the latter forward. If the type-bar is travelling fast, as the result of a hard blow upon the key-bar, the interponent member 25 will fall only a short distance before being contacted by the whip member at a point on the latter near the top thereof where the inclined portion 23 provides a relatively great interventive action and where only a hard stroke will overcome the heavier resistance thereby provided and allow the type-face to reach the platen with the correct impact. It will be observed here that under such conditions of a hard stroke a stronger whipping action is provided for the type-bar to aid the latter in its rebound action. As the key-lever is released the supporting member 33 forces the interventive member 25 upward to its original position in readiness for the next key-operation. Such repositioning of the member 25 is completed when the type-bar retreats a short distance from the platen to provide for speedy operation of the typewriter, under which circumstances one type-bar is ascending before a formerly operated bar has fully descended.

In the case of a slower type-bar stroke the interventive member 25 will be released at the same arcuate position of the type-bar but due to the slower action of the type-bar more time will elapse before the type-bar strikes the whip member 20 and consequently the interventive member 25 will fall a greater distance and will contact the whip member at a lower point on the inclined portion 23 where less interventive action is afforded and where the lighter stroke will sufficiently overcome the resistance to complete the printing operation with the correct impact. In the case of an extremely light stroke the member 25 will descend far enough to provide little or no interventive action and only the relatively light resistance of the whip member alone will have to be overcome by the type-bar under which circumstances the type-bar action will be practically unimpeded and its full force will be expended in making the printing impact.

In the embodiment shown in Figs. 4 to 8 inclusive the universal bar 48 is contacted by the type-bar when the latter reaches a point in its forward travel such as indicated in Fig. 5, whereupon through the lever 42 and the supporting member 33A the interventive member 25 will be released. A very slow stroke will provide sufficient elapse of time prior to contact of the type-bar with the whip member 20 to allow the interventive member 25 to fall to the extreme low position indicated in Fig. 6 whereby little or no interventive action is provided. Fig. 7 shows the interventive member contacting the whip member 20 at a point midway of its inclined portion 23 as a result of a medium stroke, while Fig. 8 indicates the contacted position of the member 25 in the case of an extremely hard stroke. It will be observed here that in addition to intercepting the type-bar at varying distances from the platen under different circumstances the member 25 also provides a fulcrum against which the whip-member 20 is sprung and that this fulcrum action is provided at varying distances from the outer end 24 of the whip member whereby variable resiliency is provided in the spring whip member.

In the embodiment shown in Figs. 10 to 16 inclusive a similar action is provided through the utilization of the ball 54 as an interventive member, the ball being held in the uppermost position by the support 33. Figs. 11 and 12 show the ball in the position attained at the end of an extremely slow stroke. Fig. 13 shows the interventive position of the ball for a medium stroke. The support 33 may be operated by a means such as described for other embodiments of my device, as for instance that shown in Fig. 5.

In Fig. 17, showing an oscillatory interventive member 63 which carries a spirally positioned face providing contact means for the type-bar and a rubber pad to provide resiliency, the position of the parts is such as would be attained under normal stroke conditions. The oscillatory member has been released and the spring 66 has urged the former to the position shown during the time interval between such release and contact by the type-bar, providing a definite buffering action to the type-bar consistent with the speed of the latter. The interventive member 63 provides a variable interceptive action depending upon the angular position of the member; the slower the stroke the more clockwise movement of the arcuately tapering face of the abutment member and consequently the less interventive action. Release means for this embodiment may be the same as for other embodiments. Figs 18A and 18B show this embodiment of the interventive member together with the release mechanism described in connection with Figs. 4 to 8 inclusive.

In the embodiment shown in Figs. 20 to 24 inclusive the universal bar 48 is contacted by the type-bar 3 on its forward stroke, releasing the lever 83 whereupon the arcuate interceptive member 70 is allowed to swing downward and backward to provide a progressively decreasing interceptive action to the type-bars, depending upon the amount of time elapsing between such release and contact of the member 70 by the type-bar. In this embodiment the interceptive member conforms in general arcuate shape and mid-type-bar contact position with conventional type-bar anvils in general use; however, the same automatically variable buffering action is attained therein as is provided in my other embodiments.

It will be noted that in each and all of the embodiments of my invention I have provided an interponent member which is movable to provide variable interceptive action to the type-bars; a means for holding the interponent member in a position of maximum interception; a means for releasing such holding mechanism when any of the type-bars reach a predetermined position in their forward movement; resilient means for urging the interponent member toward a position of minimum interception, and a resilient member designed to absorb the shock of excessive impacts of the type-bars, provide a whipping action to the latter and lessen the noise. It is here noted that in connection with the movement of the interponent member from a position of maximum interception to a position of minimum interception the movement is not instantaneous. Incorporated in the movable member in each instance is a mass of material having weight which cannot be moved instantly by the light springs or by gravity from one extreme position to the other, but which starts slowly from a position of rest and is gradually accelerated in its movement in accordance with well known laws of science. Such element in my invention constitutes a time controlled governing means for the interponent member whereby the movement of the latter is chronomatically metered and whereby the interponent member will traverse a certain definite distance in any given length of time. In each of the embodiments shown I have provided a means whereby a certain definite buffering action is set up for each position attained by the interponent member in its movement. I have provided means through which the movement of the interponent member is instigated when the type-bar reaches a certain position in its forward stroke regardless of the speed of the stroke. After the release of the interponent member it begins its definitely controlled movement toward a position of minimum interception and during this time the type-bar will be completing its unfinished stroke. The amount of time consumed in completing the type-bar stroke controls the action of the interponent member in setting up its buffering action. In the case of a slow stroke a longer period of time will elapse before the type-bar contacts the interponent member and consequently a lesser buffering effect will be set up, while in the case of a fast stroke a lesser amount of time will elapse and consequently a greater buffering action will result. For any type-bar speed a buffering effect is set up by the interponent member which is consistent with that particular speed and which provides the correct buffering action for each individual stroke whereby varying portions of the force of the blows are absorbed by the buffer while the remaining momentum is universally uniform to produce even printing impacts.

I claim:

1. In a typewriter having type-bars and a platen, a type-bar buffer comprising an abutment means for said type-bars, said means including a resilient shock absorbing element and a member movable to effect interception of the type-bars at variable distances from the platen; resilient means for urging said movable member from a position of maximum interception toward a position of minimum interception, means for releasably holding said movable member in a position of maximum interception, means associated with the type-bars for releasing the holding means to allow movement of the movable member from the position of maximum interception when any of the type-bars reaches a predetermined position in its forward stroke, the movement of said movable member from the position of maximum interception toward the position of minimum interception being chronomatically controlled, and means associated with the holding means for returning said movable member to a position of maximum interception when said type-bar reaches a predetermined position in its backward stroke.

2. In a typewriter having a platen and front-strike type-bars, a type-bar buffer comprising a type-bar intercepting means, said means including a movable member, said member being movable to provide interception of the type-bars at variable distances from the platen, a releasable retainer for holding said movable member in its maximum interceptive position when all of the type-bars are farthest removed from the platen, means for urging said movable member in the direction of minimum interception, the speed of said movement being chronomatically controlled, and means universally cooperable with the type-bars for releasing said retainer when any of the type-bars has traversed a predetermined portion of its forward stroke.

3. In a typewriter having front strike type-bars and a platen, a type-bar buffer comprising an abutment means for intercepting any of the type-bars as it approaches the platen in its forward stroke, said means including a movable member, said member being movable to provide interception of the type-bars at variable distances from the platen, chronomatically controlled means for urging said movable member progressively from a position providing interception of the type-bars at a maximum distance from the platen to a position providing interception of the type-bars at a minimum distance from the platen, a releasable retaining member for holding said movable member in a position of maximum intervention when all the type-bars are in fully retracted position and releasing mechanism cooperatively associated with the type-bars for releasing the retaining member when any of the type-bars has traversed a predetermined portion of its forward travel in making the printing stroke.

4. In a typewriter having type-bars, a type-bar buffer comprising a movable buffer member for intercepting the type-bars, said member being movable to provide variable interception of the type-bars, means for moving said buffer member into a position of maximum interception as said type-bars recede from said buffer member and for holding said buffer member in a position of maximum interception when the type-bars are all in a position remote from said buffer member, chronomatically controlled means for urging said buffer member progressively in a direction of minimum interception and means co-operating with said type-bars for releasing said holding means when any of said type-bars reaches a predetermined position in its forward stroke.

5. In a typewriter having a type-bar, a type-bar buffer comprising a type-bar intercepting means, said means including a movable member, said member being movable to provide variable interception of the type-bar, a releasable support for holding said movable member in a position of maximum interception when the type-bar is remote from said intercepting means, chronomatically controlled means for urging said movable member progressively in a direction of minimum interception and means cooperating with said type-bar for actuating said support to release said movable member when the type-bar reaches a predetermined position in its printing stroke.

6. In a typewriter having a platen and type-bars, a buffer for the type-bars comprising a movable buffer member disposed in universal cooperation with the type-bars whereby the type-bars are intercepted by said buffer member near the end of their forward strokes, said buffer member being movable to provide variable interception of said type-bars whereby the type-bars may be intercepted at greater or less distances from the platen, means for urging said buffer member from a position of maximum interception toward a position of minimum interception, means for holding said buffer member in a position of maximum interception when all of said type-bars are in a retracted position, and means for releasing said buffer member from the position of maximum interception when any one of said type-bars makes a forward stroke, said release occurring prior to interception of the type-bar by said buffer member, the movement of said buffer member toward the position of minimum interception being chronomatically governed.

7. In a typewriter having a platen and a type-bar, a type-bar buffer comprising a movable interventive member for intercepting the type-bar in its approach to the platen, said interventive member being movable in a manner to provide interception of the type-bar at variable distances from the platen, resilient means for urging said interventive member from a position of maximum interception toward a position of minimum interception, movable holding means for securing said interventive member in a position of maximum interception when the type-bar is farthest from the platen and means cooperating with said type-bar for releasing said interventive member from said last named position when the type-bar has been moved a predetermined distance toward said platen, the movement of said interventive member toward the position of minimum interception being chronomatically controlled.

8. In a type-writer having type bars, a buffer for said type-bars comprising a retractable anvil, chronomatically governed means for retracting said anvil, means for holding said anvil in a non-retracted position and means associated with the type-bars for releasing said retractable anvil when any of the type-bars is actuated.

9. In a type-writer having type-bars, a buffer for said type-bars comprising a retractable anvil, a holder for securing said anvil in a non-retracted position, a spring urging said anvil toward a retracted position, disengaging mechanism for releasing said anvil from a non-retracted position, said disengaging mechanism being operable by any of the type-bars during its forward stroke and mechanism for returning said anvil to a non-retracted position, the retractive movement of said anvil being chronomatically regulated.

10. In a typewriter having type-bars, a type-bar buffer comprising a resilient whip member in universal cooperative abuttal relation to said type-bars, a movable interceptive member in cooperative relation to said whip member and being movable to variably intercept said whip member whereby a greater or less abuttal effect is afforded the type-bars, a movable universal bar, said bar being operable by any of said type-bars during its printing stroke, means co-operating with said universal bar for holding said interceptive member in a position of maximum interception when none of said type-bars is in operative association with said universal bar, means cooperating with said universal bar for releasing said interceptive member from its position of maximum interception when any of said type-bars operates said universal bar, and means for urging said interceptive member in a direction of minimum interception, the movement of the interceptive member in said direction being chronomatically regulated.

11. In a typewriter having type-bars, a type-bar buffer comprising a resilient whip member in universal cooperative buffer relation to said type-bars, a movable member in cooperative interceptive relation to said whip member, said whip member having an inclined surface contactable with said interceptive member, said surface being inclined with respect to the direction of movement of said movable interceptive member, said interceptive member being movable to contact said whip member at different positions along said inclined surface whereby to afford a variable buffer action to said whip member, means for holding said interceptive member in a position affording a maximum buffering action when all of the type-bars are withdrawn at least a predetermined distance from said whip member, resilient means for moving said interceptive member progressively from a position of maximum interception toward a position of minimum interception, the speed of said movement being chronomatically regulated, and means cooperating with the type-bars for releasing said interceptive member when any of the type-bars reaches a predetermined position in its forward stroke.

12. In a typewriter having type-bars and a platen, a type-bar buffer comprising a cage adapted to afford vertical reciprocal movement to a ball positioned therein; a ball positioned in said cage; a spring whip member positioned forwardly of said ball and adapted to be struck by the type-bars as they approach the platen, said whip member having an inclined portion adapted to contact said ball, said whip member being adapted to afford greater abuttal relation to said type-bars when said ball is at its uppermost position in said cage and gradually decreasing abuttal relation when said ball is positioned progressively downward in said cage; a retainer for holding said ball in its uppermost position when all of the type-bars are removed at least a predetermined distance from the platen; releasing means adapted to release said retainer when any of the type-bars reach a predetermined position in their forward stroke whereby the ball is allowed to descend within said cage; and means for moving said ball to its uppermost position when any of said type-bars recede from the platen.

13. In a typewriter having type-bars and a platen, a type-bar buffer comprising an arcuate type-bar buffer universally contactable by the type-bars, said buffer being movable to retract from and project toward the type-bars; a releasable retainer for holding said buffer in its fully projected position when all of the type-bars are removed at least a predetermined distance from the platen; resilient means urging said buffer retractively; and means for releasing said retainer when any one of the type-bars reaches a predetermined position in its forward stroke.

14. In a typewriter having type-bars and a platen, a type-bar buffer comprising an oscillatory type-bar interceptor adapted to oscillate traversely of said type-bars as they approach the platen, said interceptor having an abuttal portion projecting toward the type-bars, the extent of projection of said portion being progressively greater from one extreme toward the other; a releasable retainer for holding said interceptor in a position affording maximum type-bar interception; spring means for urging said interceptor in a direction of minimum type-bar interception; means for releasing said retainer when any one of the type-bars reaches a predetermined position in its forward stroke and means for moving said interceptor into its maximum type-bar interception position as said type-bar recedes from the platen.

15. In a typewriter having a platen and front strike type-bars, a type-bar impression control comprising a movable member; a resilient member disposed forwardly of said movable member and adapted to be struck by the type-bars; said movable member being adapted to support said resilient member against rearward movement when the latter is struck by the type-bars and being movable to support said resilient member in various positions of forward projection whereby the type-bars may be intercepted at various distances from the platen; resilient means for urging said movable member from a position affording maximum type-bar interception to said resilient member toward a position affording minimum type-bar interception to said resilient member; a releasable retainer for holding said movable member in said maximum interception position; and means for releasing said retainer when any one of the type-bars reaches a predetermined position in its forward stroke and for moving said movable member into aforesaid maximum interception position as said type-bar recedes from the platen.

16. In a typewriter having front strike type-bars, a variable type-bar interceptor comprising a movable abutment member; a resilient shock absorbing member positioned forwardly of said abutment member and adapted to be struck by the type-bars; said movable member being adapted to provide abuttal support for said resilient member and being movable to permit varying recession of said resilient member when the latter is struck by any of the type-bars whereby varying degrees of interception may be provided for the type-bars; resilient means for urging said movable member from a position affording maximum type-bar interception to said resilient member toward a position affording minimum type-bar interception to said resilient member; a releasable support for holding said movable member in a position affording maximum interception to the resilient member; and means for releasing said support when any one of the type-bars reaches a predetermined position in its forward stroke and for operating said support to move said movable member into a position affording maximum type-bar interception to said resilient member as said type-bar recedes from the resilient member on its backward stroke.

17. In a typewriter having front strike type-bars and a platen, a variable type-bar buffer comprising a resilient shock absorbing member adapted to be struck by the type-bars; a movable supporting member for said shock absorbing member, said supporting member being adapted to support said shock absorbing member in varying positions of frontal projection when struck by the type-bars; means for moving said supporting member into a position for supporting said shock absorbing member in maximum frontal disposition as the type-bars recede from the platen and for holding said supporting member in said position when the type-bars are all in a position remote from said platen; chronomatically controlled means for urging said supporting member progressively from said maximum supporting position toward a supporting position affording minimum projection to said shock absorbing member, and means operable by the type-bars for releasing said holding means when any one of the type-bars reaches a predetermined position in its forward stroke.

18. In a typewriter having front strike type-bars and a platen, a variable type-bar buffer comprising a movable member; an impact receiving member positioned in the path of said type-bars and being interposed between said movable member and said type-bars and adapted to be struck by said type-bars as they near the platen on their forward stroke; said movable member being adapted to restrain said impact receiving member against rearward movement, said movable member being movable to restrain said impact receiving member in varying positions of frontal projection; means for moving said movable member into a position to restrain the impact receiving member in maximum frontal projection as any one of the type-bars recedes from the platen and for holding said movable member in said position when the type-bars are all in a position remote from said platen; chronomatically controlled means for urging said movable member progressively from said maximum restraining position toward a restraining position affording minimum frontal projection to said impact receiving member, and means for releasing said holding means when any of said type bars reaches a predetermined position in its forward stroke.

19. In a typewriter having front strike type-bars and a platen, a variable type-bar buffer comprising a movable member and a resilient member, said resilient member being adapted to be struck by the type-bars and being interposed between the type-bars and said movable member, said movable member being adapted to support the resilient member against the impact of the type-bars and being movable to support the resilient member in varying positions of frontal projection; means for moving said movable member into a position affording maximum frontal projection to said resilient member as any one of said type-bars recedes from the platen and for holding said movable member in said maximum position when the type-bars are all in a position remote from said platen; chronomatically controlled means for urging said movable member progressively in a direction affording support for said resilient member in minimum frontal projection; and means for releasing said holding means when any of said type-bars reaches a predetermined position in its forward stroke.

20. In a typewriter having front strike type-bars, a platen and a variable type-bar buffer mechanism adapted to intercept the type-bars at varying distances from the platen, operating means for said buffer mechanism comprising resilient means for urging said buffer mechanism from a position affording maximum type-bar interception toward a position affording minimum type-bar interception; a releasable holding member for holding said buffer mechanism in a position of maximum interception when all of the type-bars are removed a predetermined distance from the platen; and means for releasing said holding member when any one of the type-bars reaches a predetermined position in its forward stroke.

21. In a typewriter having front strike type-bars, a platen and a variable type-bar interceptor, a control mechanism for said interceptor comprising a releasable retainer for holding said interceptor in a condition of maximum interception when all of the type-bars are removed a predetermined distance from said platen, means for releasing said retainer when any one of said type-bars reaches a predetermined position in its forward stroke and chronomatically controlled means for progressively operating said interceptor to change its type-bar interception from maximum to minimum.

22. In a typewriter having front strike type-bars and a platen, a variable interceptor for the type-bars comprising an impact receiving member adapted to be struck by the type-bars and a movable member adapted to support the impact receiving member in various positions of frontal projection.

23. In a typewriter having front strike type-bars and a platen, a variable type-bar interceptor comprising an impact receiving member adapted to be struck by the type-bars; a movable member adapted to support the impact receiving member in various positions of frontal projection, and means for moving said movable member from a position affording maximum type-bar interception to said impact receiving member toward a position affording minimum type-bar interception to said impact receiving member when any one of the type-bars is operated in its forward stroke.

24. In a typewriter having a platen and front strike type-bars, a type-bar impression control comprising a movable member; a resilient device disposed forwardly of said movable member and adapted to be struck by the type-bars, said movable member being adapted to support said resilient device against rearward movement when the latter is struck by the type-bars and being movable to support said resilient device in positions affording arrestment of the type-bars at various distances from the platen; resilient means for urging said movable member from a position affording maximum type-bar arrestment to said resilient device toward a position affording minimum type-bar arrestment to said resilient device; a releasable retainer for holding said movable member in said position affording maximum type-bar arrestment to said resilient device and means for releasing said retainer when any one of the type-bars reaches a predetermined position in its forward stroke and for moving said movable member into aforesaid position affording maximum type-bar arrestment to said resilient device.

25. In a typewriter having front strike type-bars, a variable type-bar interceptor comprising a movable abutment member; a resilient shock absorbing device positioned forwardly of said abutment member and adapted to be struck by the type-bars, said movable member being adapted to provide abuttal support for said resilient device when the latter is struck by the type-bars whereby arrestment of the type-bars is afforded, said movable abutment member being adapted to be moved to positions affording varying degrees of type-bar arrestment to said resilient device; resilient means for urging said movable member from a position affording maximum type-bar arrestment to said resilient device toward a position affording minimum type-bar arrestment to said resilient device; a releasable support for holding said movable member in a position affording maximum type-bar arrestment to said resilient device and means for releasing said support when any one of the type-bars reaches a predetermined position in its forward stroke and for operating said support to move said movable member into a position affording maximum type-bar arrestment to said resilient device as said type-bar recedes from the resilient device on its backward stroke.

26. In a typewriter having front strike type-bars, a platen and a variable type-bar buffer mechanism adapted to arrest the type-bars at varying distances from the platen, said mechanism including a resilient device adapted to be struck by the type-bars; control means for said buffer mechanism comprising a movable member adapted to varyingly support said resilient device against rearward movement; resilient means for urging said movable member from a position affording maximum type-bar arrestment to said resilient device toward a position affording minimum type-bar arrestment to said resilient device; a releasable holding member for holding said movable member in a position affording maximum type-bar arrestment to said resilient device when all of the type-bars are removed a predetermined distance from the platen and means for releasing said holding member when any one of the type-bars reaches a predetermined position in its forward stroke.

27. In a typewriter having front strike type-bars and a platen, a variable type-bar buffer comprising a resilient shock absorbing device adapted to be struck by the type-bars; a movable supporting member for said shock absorbing device, said supporting member being adapted to support said shock absorbing device in positions affording varying type-bar arrestment when struck by the type-bars; means for moving said supporting member into a position for supporting said shock absorbing device in maximum type-bar arrestment disposition as the type-bars recede from the platen and for holding said supporting member in said position when the type-bars are all in a position remote from said platen; chronomatically controlled means for urging said supporting member progressively from said maximum supporting position toward a supporting position affording minimum type-bar arrestment to said shock absorbing device and means operable by the type-bars for releasing said holding means when any one of the type-bars reaches a predetermined position in its forward stroke.

28. In a typewriter having front strike type-bars and a platen, a variable type-bar buffer comprising a movable member; an impact receiving member positioned in the path of said type-bars and being interposed between said movable member and said type-bars and adapted to be struck by said type-bars as they near the platen on their forward stroke, said movable member being adapted to restrain said impact receiving member against rearward movement, said movable member being movable to restrain said impact receiving member in positions affording arrestment of the type-bars at varying distances from the platen; means for moving said movable member into a position to restrain the impact receiving member in a position affording arrestment of the type-bars at a maximum distance from the platen as any one of the type-bars recedes from the platen and for holding said movable member in said position when the type-bars are all in a position remote from said platen; chronomatically controlled means for urging said movable member progressively from said position affording restraint of the impact receiving member in maximum type-bar arrestment position toward a restraining position affording minimum type-bar arrestment to said impact receiving member and means for releasing said holding means when any one of said type-bars reaches a predetermined position in its forward stroke.

HOMER W. YOUNG.